P. M. ORLOPP.
AUXILIARY AIR INTAKE FOR INTERNAL COMBUSTION ENGINES.
APPLICATION FILED MAY 5, 1919.
1,340,734. Patented May 18, 1920.
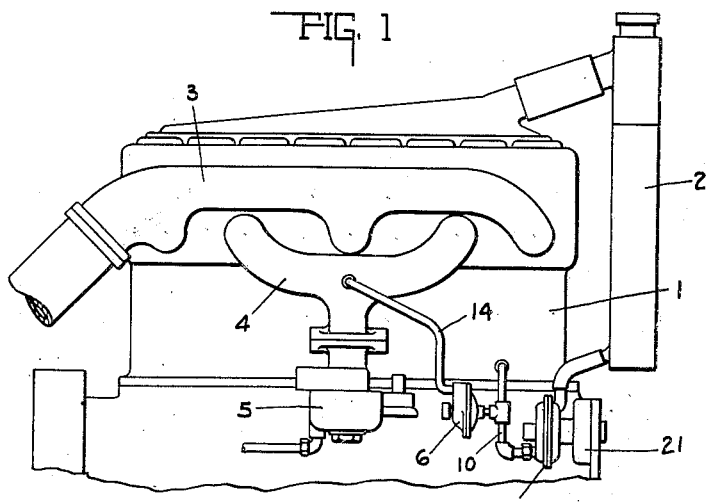
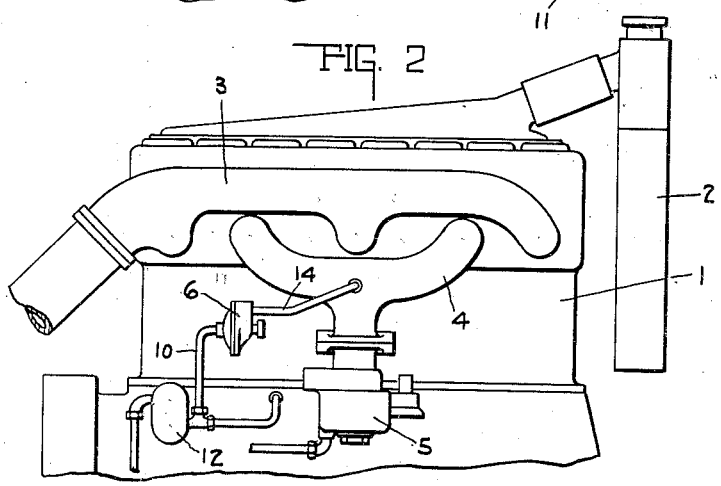
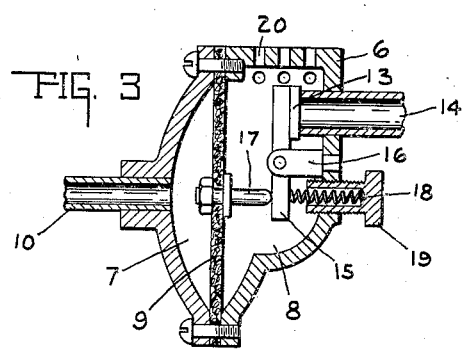
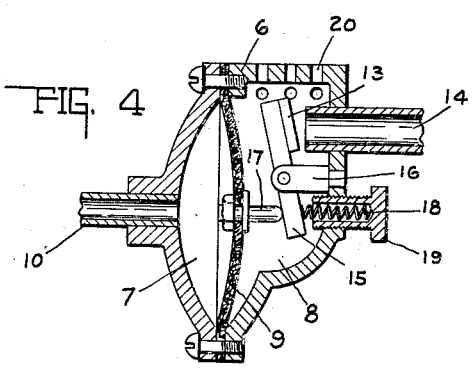
INVENTOR.
PIATT M. ORLOPP.
BY
Lockwood & Lockwood
ATTORNEYS.

UNITED STATES PATENT OFFICE.

PIATT M. ORLOPP, OF INDIANAPOLIS, INDIANA.

AUXILIARY AIR-INTAKE FOR INTERNAL-COMBUSTION ENGINES.

1,340,734. Specification of Letters Patent. Patented May 18, 1920.

Application filed May 5, 1919. Serial No. 294,939.

*To all whom it may concern:*

Be it known that I, PIATT M. ORLOPP, a citizen of the United States, and a resident of Indianapolis, county of Marion, and State of Indiana, have invented a certain new and useful Auxiliary Air-Intake for Internal-Combustion Engines; and I do hereby declare that the following is a full, clear, and exact description thereof, reference being had to the accompanying drawings, in which like numerals refer to like parts.

This invention relates to means for introducing air into the intake manifold of an internal combustion engine, and the prime feature of the invention is the provision of means for supplying air into the intake manifold at a point beyond the butterfly valve or throttle of the carbureter so as to supply air to the cylinders of the engine and prevent excessive vacuum from forming in the cylinders, should the throttle valve be closed and the pistons of the engine continue running at relatively high speed.

A further feature of the invention is the provision of an automatically operated air valve for controlling the admission of the air into the manifold.

A further feature of the invention is the provision of means for connecting the air valve to a pump structure driven by the engine, preferably the water pump or oil pump, and so construct the valve that the pressure of the fluid passing through the pump structure will be utilized for opening the valve, thereby operating the valve in accordance with the speed of the engine.

A further feature of the invention is in so controlling the admission of the air into the intake manifold that the fuel or mixture passing through the manifold will be enhanced in its explosive value in accordance with the speed of the motor.

Other objects and advantages will be hereinafter more fully set forth and pointed out in the accompanying specification.

In the accompanying drawings, which are made a part of this application, Figure 1 is a side elevation of an engine, such as is used in connection with automobiles or the like, showing an air controlling mechanism attached to the water pump of the motor. Fig. 2 is a similar view showing the air controlling mechanism attached to the oil pump of the engine. Fig. 3 is an enlarged detail sectional view through the air valve showing the same in its inoperative position, and Fig. 4 is a similar view showing the valve in its operative or open position and admitting air therethrough.

Referring to the drawings, in which similar reference numerals designate corresponding parts throughout the several views, 1 indicates an engine of that class used in connection with automobiles, 2 indicates a radiator, 3 an exhaust manifold, 4 an intake manifold and 5 a carbureter connected with the manifold, these parts being of the ordinary or any preferred construction, the carbureter 5 being provided with the usual throttle (not shown), which in the usual manner controls the admission of air and fuel into the intake manifold.

In engines of this class considerable difficulty is encountered in preventing vacuum forming in the cylinders of the engine, due to closing the throttle valve of the carbureter so as to cut off the fluid and air before the engine has stopped running at relatively high speed, such vacuum resulting in drawing oil around the pistons of the motor into the firing chamber of the cylinder, thus causing carbon to form in the cylinders.

A further difficulty encountered with engines of this class is in obtaining the proper amount of air for increasing the explosive properties of the fuel at all times, particularly when the throttle is suddenly opened wide for increasing the power of the motor to climb a hill, or in such instances as increased power is desired to properly drive the automobile.

To this end an automatically operated air valve 6 is provided, the interior of said valve being divided into chambers 7 and 8 by extending a diaphragm 9 through the air valve. Connected at one end to the chamber 7 is a pipe 10, the opposite end of which is attached to a pump 11 employed for pumping water through the water jacket and radiator of the engine, as shown in Fig. 1, or to the oil pump 12 employed for forcing the lubricating oil through the parts of the engine, as shown in Fig. 2, both of these pumps being driven by the engine 1.

On the opposite side of the diaphragm 9 is positioned a valve 13, which is adapted to coöperate with a pipe 14 extending from the chamber 8 to the intake manifold 4, the pipe 14 connecting with the intake manifold adjacent its upper end and at a point removed from the carbureter and between the butterfly valve of the carbureter and the cylinders of the engine, so that the air passing through the pipe 14 will not in any manner be influenced by the throttle valve of the carbureter. The valve 13 is attached to one end of a valve lever 15, said lever being pivoted at a point between its ends to a bracket 16, which bracket is attached to the wall of the chamber 8. The valve 13 is automatically opened by the expansion of the diaphragm 9 in one direction, a plunger 17 being attached preferably at the axial center of the diaphragm so as to contact with the end of the lever 15 opposite the valve 13, and when pressure is directed against this end of the lever, the valve 13 will be forced open so that air may pass through the pipe 14 into the manifold. To cause the valve 13 to positively seat over the end of the pipe 14 after the pressure has been relieved from the diaphragm 9, a spring 18 is arranged to direct pressure against the end of the lever 15 at a point opposite the plunger 17, and in order to regulate the tension of this spring it is mounted in an adjusting screw 19 which is threaded through the wall of the air valve 6 and may be adjusted toward or from the end of the valve lever in order to increase or decrease the pressure of the spring 18 therein. In addition to providing the spring 18 for moving the valve 13 to closed position, the suction created through the pipe 14 will aid in closing the valve 13 and hold said valve in closed position until the diaphragm is again operated to open the valve. When the valve 13 is open, air is drawn through the pipe 14, the walls of the chamber 8 having a plurality of openings 20 therethrough through which air may be drawn into the interior of the chamber 8 and pass thence into the pipe 14.

As the pumps 11 and 12 are driven by the motor, the pump 11 through the usual gear construction 21, the valve 13 will be closed when the engine is stopped, but when the engine starts to operate the pump to which the air valve is attached will be set in motion, and consequently create a pressure in the chamber 7 of the air valve, and as said pressure increases, due to the increased speed of the motor and pump operated thereby, the diaphragm 9 will be extended laterally which will engage the plunger thereon with the lever 15 and rock said lever on its pivot and unseat the valve 13 and permit air to be drawn through the pipe 14 into the manifold and from thence into the cylinders of the engine, the amount of air so drawn into the manifold and engine being likewise determined by the speed of the engine.

The admission of the air through the pipe 14 into the manifold not only furnishes air to be drawn into the cylinders, even after the throttle valve of the carbureter is closed, and thereby eliminating excessive vacuum in the cylinders, but such air is commingled with the fuel passing through the intake manifold and energizes the same to such an extent as to increase the driving force thereof, this being especially valuable in case of emergency when a sudden increase of power is required, and as the air valve is controlled entirely by the action of the engine, air will be admitted into the manifold only as required.

The invention claimed is:

1. The combination with an internal combustion engine having a fuel intake, of an auxiliary means for supplying air to said intake, including a housing, an air passage connecting said housing and intake, a valvular member pivotally mounted in said housing for opening and closing said passage, yielding means for engaging the actuating end of said member for normally retaining said valve in closed position, and a diaphragm mounted in said housing having a projection thereon for engaging the actuating end of said member for causing said valve to open when the engine acquires a certain speed.

2. The combination with an internal combustion engine, a fuel intake and a fluid pump, of an auxiliary means for supplying air to said intake, including a housing, an air passage connecting said housing and intake, a valve pivotally mounted in said housing for opening and closing said passage, a compression spring for normally retaining said valve in closed position, a passageway connecting said pump with said housing, and a diaphragm mounted in said housing between said passageways for overcoming said spring and opening said valve by the pressure exerted by said pump.

In witness whereof I have hereunto affixed my signature.

PIATT M. ORLOPP.